United States Patent [19]
Prenger et al.

[11] Patent Number: 5,817,270
[45] Date of Patent: Oct. 6, 1998

[54] METHOD AND DEVICE FOR MANUFACTURING BIAXIALLY ORIENTED TUBING FROM THERMOPLASTIC MATERIAL

[75] Inventors: Jan Hendrik Prenger, Hardenberg; Johan Schuurman, Dedemsvaart; Jan Visscher, Lutten, all of Netherlands

[73] Assignee: Wavin B.V., Swolle, Netherlands

[21] Appl. No.: 716,401

[22] PCT Filed: Mar. 17, 1995

[86] PCT No.: PCT/NL95/00098

§ 371 Date: Nov. 22, 1996

§ 102(e) Date: Nov. 22, 1996

[87] PCT Pub. No.: WO95/25626

PCT Pub. Date: Sep. 28, 1995

[30] Foreign Application Priority Data

Mar. 22, 1994 [NL] Netherlands ............................ 9400451

[51] Int. Cl.[6] .................................................... B29C 47/90
[52] U.S. Cl. .................................. 264/290.2; 264/209.4; 264/209.5; 425/325; 425/384; 425/392
[58] Field of Search ................................ 264/290.2, 40.1, 264/40.5, 40.6, 40.7, 209.4, 209.5; 425/140, 325, 384, 392

[56] References Cited

U.S. PATENT DOCUMENTS

| | | |
|---|---|---|
| 3,249,671 | 5/1966 | Perrone et al. ........................ 364/209.5 |
| 3,274,314 | 9/1966 | Hudson et al. . |
| 3,296,661 | 1/1967 | Moustier ............................ 264/209.5 |
| 3,856,905 | 12/1974 | Dawson .................................... 264/89 |
| 5,096,634 | 3/1992 | Tsadares et al. . |
| 5,449,487 | 9/1995 | Jarvenkyla .............................. 264/508 |
| 5,460,771 | 10/1995 | Mitchell et al. ........................ 264/508 |

FOREIGN PATENT DOCUMENTS

| | | |
|---|---|---|
| 0 441 142 A3 | 1/1991 | European Pat. Off. . |
| 0 477 081 A2 | 3/1992 | European Pat. Off. . |
| 27 37 357 | 2/1978 | Germany . |
| 41 29 881 A1 | 9/1991 | Germany . |
| WO 90/02644 | 3/1990 | United Kingdom . |
| WO 93/19924 | 4/1993 | United Kingdom . |

*Primary Examiner*—Jan H. Silbaugh
*Assistant Examiner*—Mark Eashoo
*Attorney, Agent, or Firm*—Wigman, Cohen, Leitner & Myers, P.C.

[57] ABSTRACT

Method and devices for manufacturing biaxially oriented tubing from thermoplastic material. The method includes forcing the tube over a mandrel at an orientation temperature of the plastic material, which mandrel includes an expansion part which produces expansion in the circumferential direction of the tube. The forcing over the mandrel is achieved by exerting a pushing force on the tube upstream of the expansion part of the mandrel by a pushing device acting upon the outside of the tube, and by exerting a pulling force on the tube downstream of the mandrel. The pushing device acts upon the tube at a distance upstream of the mandrel, and the tube is supported between the place where said pushing device acts and the expansion part of the mandrel.

4 Claims, 3 Drawing Sheets

METHOD AND DEVICE FOR MANUFACTURING BIAXIALLY ORIENTED TUBING FROM THERMOPLASTIC MATERIAL

FIELD OF THE INVENTION

The present invention relates to a method for manufacturing biaxially oriented tubing from thermoplastic material, comprising forcing the tube over a mandrel at an orientation temperature of the plastic material, which mandrel comprises an expansion part which produces expansion in the circumferential direction of the tube, the forcing over the mandrel being achieved by exerting a pushing force on the tube upstream of the expansion part of the mandrel by means of pushing means acting upon the outside of the tube, and by exerting a pulling force on the tube downstream of the mandrel. In the context of the present invention the term tube also relates to hose-type products.

BACKGROUND OF THE INVENTION

The present invention also relates to a device for manufacturing biaxially oriented tubing from thermoplastic material, comprising a mandrel over which the tube is forced at an orientation temperature of the plastic material, which mandrel comprises an expansion part which produces expansion in the circumferential direction of the tube, while the device for forcing the tube over the mandrel comprises pushing means which are placed upstream of the expansion part of the mandrel and, by acting upon the outside of the tube, can exert a pushing force on the tube, and also comprises pulling means placed downstream of the mandrel, for exerting a pulling force on the tube.

The object of biaxial orientation of the plastic material of a tube, also known as biaxially stretching a tube, is to improve the properties of the tube through orientation of the molecules of the plastic material of the tube in two mutually perpendicular directions. In the case of a certain known method the biaxial orientation is produced by forcing the tube over a mandrel, as a result of which the tube is deformed. Upstream of the mandrel the tube is brought to a suitable orientation temperature. In practice, a temperature distribution which is within a suitable range for biaxial orientation of the molecules of the plastic material of the tube is present inside the tube wall.

In the case of the known method an axial pulling force is exerted on the tube downstream of the mandrel. The solid mandrel comprises a conical expansion part which produces the increase in the dimensions in the circumferential direction of the tube. The fact that the tube passes over this expansion part essentially determines the orientation of the plastic material in the circumferential direction of the tube. The axial pulling force essentially determines the orientation in the axial direction. The biaxial orientation obtained is fixed (frozen) by cooling down the tube.

A method and device of the type mentioned in the preamble is known from EP-A-0 563 721. This publication describes how a tube with a cylindrical tube wall is manufactured in a continuous process by means of an extruder. Viewed in the direction of movement of the tube, a solid, undeformable mandrel with a conical expansion part is situated downstream of the extruder. The tube is forced over the mandrel at an orientation temperature which is suitable for the plastic material concerned, through a pulling force being exerted on the tube downstream of the mandrel. Upstream of the expansion part of the mandrel a pushing force is also exerted on the tube, i.e. a thrusting force in the direction of the expansion part of the mandrel. The additional pushing force permits a reduction of the pulling force exerted on the tube—which is limited in practice by the tear strength of the viscous plastic material of the tube—and a greater degree of biaxial orientation.

The pushing force is achieved by means of a so-called corrugator. The corrugator shown comprises two chains with hingedly coupled blocks, each of which is moved along a corresponding closed track. The two closed tracks have an active part in which the tube to be oriented is enclosed by the facing tube contact faces of the blocks of the two chains. An essentially cylindrical run-on part of the mandrel is situated in the interior of the tube in the region where these blocks act upon the outer circumference of the tube. The diameter of the run-on part essentially corresponds to the internal diameter of the tube at this point.

In order to obtain the contact between the tube and the blocks which is necessary for exerting a pushing force on the tube, in a particular embodiment (EP-A-0 563 721) use is made of a groove pattern present in the tube contact face of the blocks. Enclosing the tube between the run-on part of the mandrel and the blocks means that the groove pattern forms ribs on the outside of the then still warm and viscous tube, with the result that the advancing blocks can carry the tube along with them. In another embodiment the blocks of the corrugator have a smooth and semi-cylindrical tube contact face for propelling a smooth round tube. In order to produce sufficient radial surface pressure between the tube and the blocks in that situation, it is proposed that the cooling liquid introduced into the tube should be brought to a raised pressure, so that the tube is expanded radially and pressed against the blocks of the corrugator.

The method and device known from EP-A-0 563 721 have a number of major disadvantages, which give rise to problems in carrying out the method in practice and adversely affect the quality of the manufactured tube. First, the tube to be stretched is in fact enclosed at the level of the pushing means between the undeformable blocks of the corrugator on the outside of the tube and the run-on part of the mandrel, which lies inside the tube in the application zone of the blocks. Such a situation of enclosure of the tube is undesirable in the case of a biaxial orientation process. It has, in fact, been found that, even if an effort is made to maintain a liquid film between the mandrel and the tube, as described in EP-A-0 563 721, there is a very great risk of the tube becoming stuck on the run-on part of the mandrel. All that is necessary for this to happen is for the thickness of the liquid film to fall off or be disrupted at a single point, a situation which is difficult to avoid in practice. The result is that the output of tubular material from the extruder is abruptly blocked, which will lead not only to stoppage of the process, but also to serious damage to the extruder.

A second disadvantage is that, in particular in the manufacture of a smooth tube, i.e. a tube without surface profiling on the outer circumference, only a limited pushing force can be exerted on the tube in the case of the known method and device. Said pushing force in the case of the known method and device in fact depends on the radial surface pressure which the internal pressure in the tube produces between the tube and the smooth tube contact faces of the blocks of the corrugator. The internal pressure to be applied in the tube is, however, limited by the low strength of the still viscous plastic material at that moment.

Another major disadvantage of the known method and device concerns the uniformity of the pushing force exerted on the tube. This can be seen as follows. In the case of the known method a part of the tube will be enclosed by two interacting blocks of the corrugator, until the paths of the blocks make said blocks move apart. This results in a rapid transition between the state in which the tube part in question is enclosed by the blocks and the state in which said tube part is "free". This produces the phenomenon that the distance between the expansion part of the mandrel and the place where the tube is enclosed by the blocks of the corrugator varies constantly between a maximum and a minimum value. In particular, the increase in the distance from the minimum to the maximum value occurs with a very rapid transition. This effect means that the pushing force exerted by the corrugator and the tension state of the material of the tube at the position of the mandrel vary constantly.

The positioning of the expansion part of the mandrel a short distance downstream of the corrugator, which positioning is considered essential according to EP-A-0 563 721, means that the relative change in the abovementioned distance is very considerable. The pushing force exerted on the tube in this way is consequently not uniform, but pulsatory. The result of this is that in the axial direction of the ultimately manufactured tube an undesirable wavy development is present in the wall thickness and in the degree of orientation.

SUMMARY OF THE INVENTION

The object of the present invention is to eliminate the abovementioned disadvantages. To this end, the invention provides a method according to the preamble of claim 1, which is characterized in that the pushing means act upon an internally not rigidly supported part of the tube at a distance upstream of the mandrel, and in that the tube is supported between the place where these pushing means act and the expansion part of the mandrel. In other words, the invention proposes that the pushing drive should be positioned in such a way relative to the mandrel that the risk of the tube becoming stuck between undeformable elements on the inside and the outside of the tube is avoided. The invention is also based on the insight that a relatively great distance between the pushing means and the expansion part of the mandrel leads to a damping of any pulsations in the pushing force exerted by the pushing means. The result is that the stress state of the material of the tube remains constant as far as possible at the position of the mandrel. However, the envisaged distance between the pushing means and the expansion part does mean that in this region the tube will have the tendency to buckle. In order to avoid this buckling, the invention proposes that the tube should be supported in this region. The tube need not be supported over the entire distance, and it can be supported either internally or externally.

In the case of the method according to the present invention the appropriate distance between the pushing means and the expansion part of the mandrel will have to be established from case to case. Various parameters, for example the dimensions of the tube, the degree of deformation in the circumferential direction of the tube during its passage over the expansion part of the mandrel, the envisaged pushing force and the properties of the plastic material, will be found to be important here.

Moreover, in the case of the method according to the invention, in which at the position of the pushing means there is no solid element present inside the tube on which the tube can easily become stuck in practice, it is advantageously possible for the tube, which has to be biaxially orientated and has an initial cross-section upstream of the pushing means, to be driven by pushing means which act upon the tube and deform the initial cross-section of the tube. The tube is then forced over a mandrel which has a cross-section whose shape corresponds to the shape of the internal cross-section of the tube to be manufactured. Internal cross-section in this case should be understood as the surface bounded by the internal face of the tube in a direction at right angles to the direction of movement of the tube. In the manufacture of a biaxially oriented cylindrical tube, for which there will be the greatest demand in practice, this means that the tube for biaxial orientation comes out of an extruder as a tube with a cylindrical tube wall, which is then deformed, for example to an oval shape, by the pushing means acting upon the tube. The ultimately desired shape of tube is obtained by then forcing the tube over a mandrel with an essentially round cross-section. Moreover, it is self-evident that the largest cross-sectional surface of the mandrel is larger than the envisaged internal cross-section of the tube to be manufactured. After it has passed over the mandrel, the tube will in fact shrink as the result of cooling.

The above-described measure according to the invention is based on the insight that the biaxial orientation of the molecules of the plastic material occurring downstream of the pushing means allows the tube to be gripped, deforming the original cross-section with which the tube comes out of the extruder. The surface pressure produced by this between the pushing means and the tube makes it possible for a considerably greater pushing force to be exerted on the tube than in the case of the known method.

The tube is preferably driven through pushing by pushing means which act upon the tube over a length, the action of the pushing means being produced by several active elements of said pushing means which clamp the tube between them, the clamping of the tube being removed gradually as it leaves the pushing means. A lower limit for the surface area with which the pushing means act upon the outside of the tube is formed by the maximum permissible surface pressure between the tube and the pushing means. Said surface pressure must not be so great that it can cause damage to the tube.

In a particular embodiment the pushing means enclose the outer circumference of the tube. This means that, when the pushing means act upon the tube and deform it, the active elements of the pushing means acting upon the tube must be of a shape which corresponds to the envisaged deformation.

The present invention also provides a device according to the preamble of Claim 5, which is characterized in that the pushing means are positioned in such a way that they act upon an internally not rigidly supported part of the tube at a distance upstream of the mandrel, and in that the device comprises supporting means which support the tube between the place where the pushing means act and the expansion part of the mandrel. The above-described method according to the invention can be carried out in an advantageous way with such a device.

In an advantageous embodiment the supporting means comprise a run-on part of the mandrel situated upstream of the expansion part of the mandrel. The cross-section of the run-on part is preferably slightly larger than the internal cross-section of the tube upstream of the pushing means. This measure is based on the insight that in the tract between the pushing means and the expansion part of the mandrel the tube is subjected to an axial pressure which can lead to buckling of the tube. Supporting the tube by means of the run-on part of the mandrel makes the buckling length shorter, with the result that a greater pushing force can be exerted upon the tube.

The axial pressure on the tube also leads to upsetting of the tube, with the result that the internal dimensions of the tube at that point will be slightly greater, generally several per cent (1–5%), than upstream of the pushing means. For correct guidance of the tube relative to the mandrel it is, however, desirable for the tube to be centred upstream of the expansion part of the mandrel by a run-on part of said mandrel. In order to obtain contact between tube and run-on part, the diameter of the run-on part must then be adapted to the increase in the internal diameter of the tube as the result of the upsetting effect. The length of the run-on part is preferably at least three times the internal diameter of the tube at that point.

Another result of upsetting of the tube is that the surface pressure actually occurring between the tube and the pushing means will be greater than the surface pressure which is produced solely by the pushing means acting upon the tube. As the result of this increase in the surface pressure, a greater pushing force can be exerted upon the tube.

In an advantageous embodiment a sealing element for the interior of the tube is placed upstream of the pushing means, and means are provided for supplying a cooling medium to the interior of the tube between the sealing element and the mandrel.

The present invention also relates to pushing means for exerting a pushing force on a plastic tube. Said pushing means according to the invention are suitable in particular for a method and device of the above-described type for the biaxial orientation of a tube made of thermoplastic material. However, the pushing means can also be used in other processes where a propelling drive of a plastic tube is desired. In an advantageous embodiment the pushing means comprise a frame bearing at least two chains of blocks, which blocks can be moved along a corresponding closed track, each closed track having an active part in which the blocks belonging to the different chains act together upon the outside of the tube. For driving a tube with a round initial cross-section the blocks are preferably designed in such a way that interacting blocks form a cavity with an oval cross-section for the accommodation of the tube. This therefore means that the tube, which is round in the first instance, is deformed to an oval cross-section through being acted upon by the blocks. The radial surface pressure between the tube, on the one hand, and the blocks, on the other, caused by the deformation resistance of the tube, makes it possible to exert a great pushing force on the tube, without any risk of the blocks slipping relative to the tube. This is advantageous in particular if a tube with a smooth outside has to be manufactured.

In another advantageous embodiment the pushing device comprises two chains of blocks, each block forming a half of the cavity bounded by the largest dimension of the oval cross-section. This solution has considerable advantages over the known blocks which each bound a half of a cylindrical cavity. For producing sufficient radial surface pressure between the latter blocks and the tube it will therefore be necessary to select a slightly smaller diameter for the cylindrical cavity than the diameter of the tube to be accommodated therein. This leads to the formation of burrs on the tube wall at the position of the seams between the blocks, which is very undesirable.

Through the measure according to the invention, the tube is first deformed at a place where no seam is present. The occurrence of burrs is ruled out by then ensuring that the circumferential dimension of the contact face for the tube against the blocks is slightly larger than the circumferential dimension of the tube. Furthermore, the radial surface pressure between the tube and the blocks is also increased by the above-described "upsetting effect" of the tube between the pushing device and the expansion part of the mandrel.

The pushing means are advantageously provided with temperature-regulating means, for regulating the temperature of the parts of the pushing means acting upon the tube.

BRIEF DESCRIPTION OF THE DRAWINGS

The invention will be explained in greater detail below with reference to the drawing, in which.

DETAILED DESCRIPTION OF THE INVENTION

Figure 1:
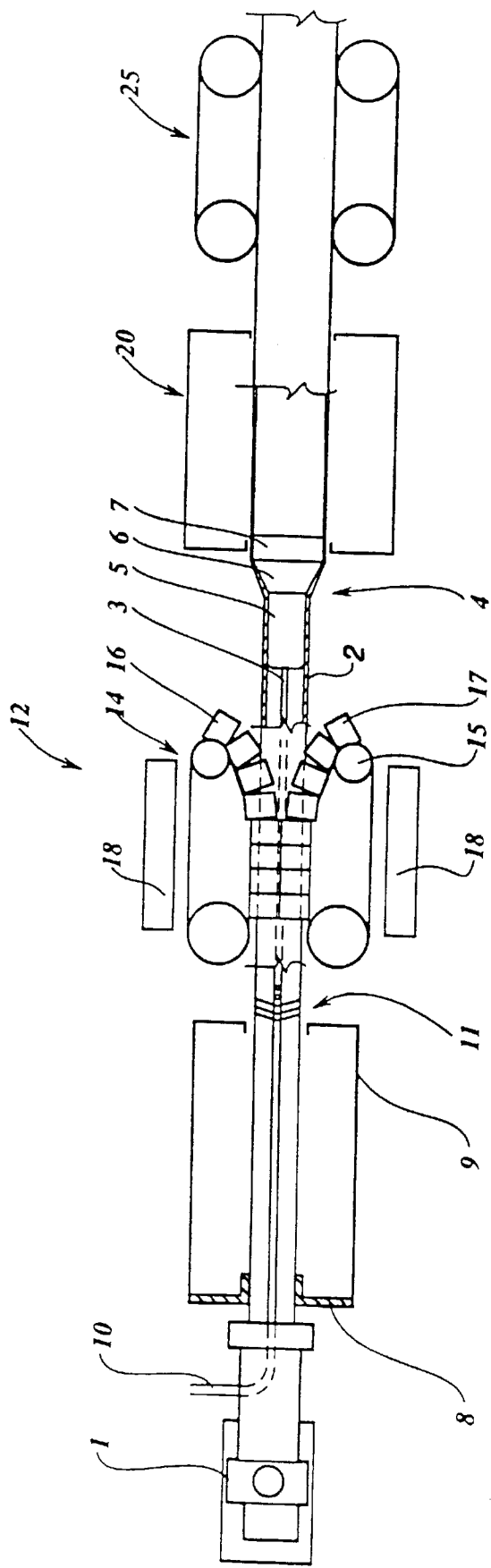
FIG. 1 shows diagrammatically in a top view an exemplary embodiment of a device according to the invention for manufacturing biaxially oriented tubing.
Figure 2:
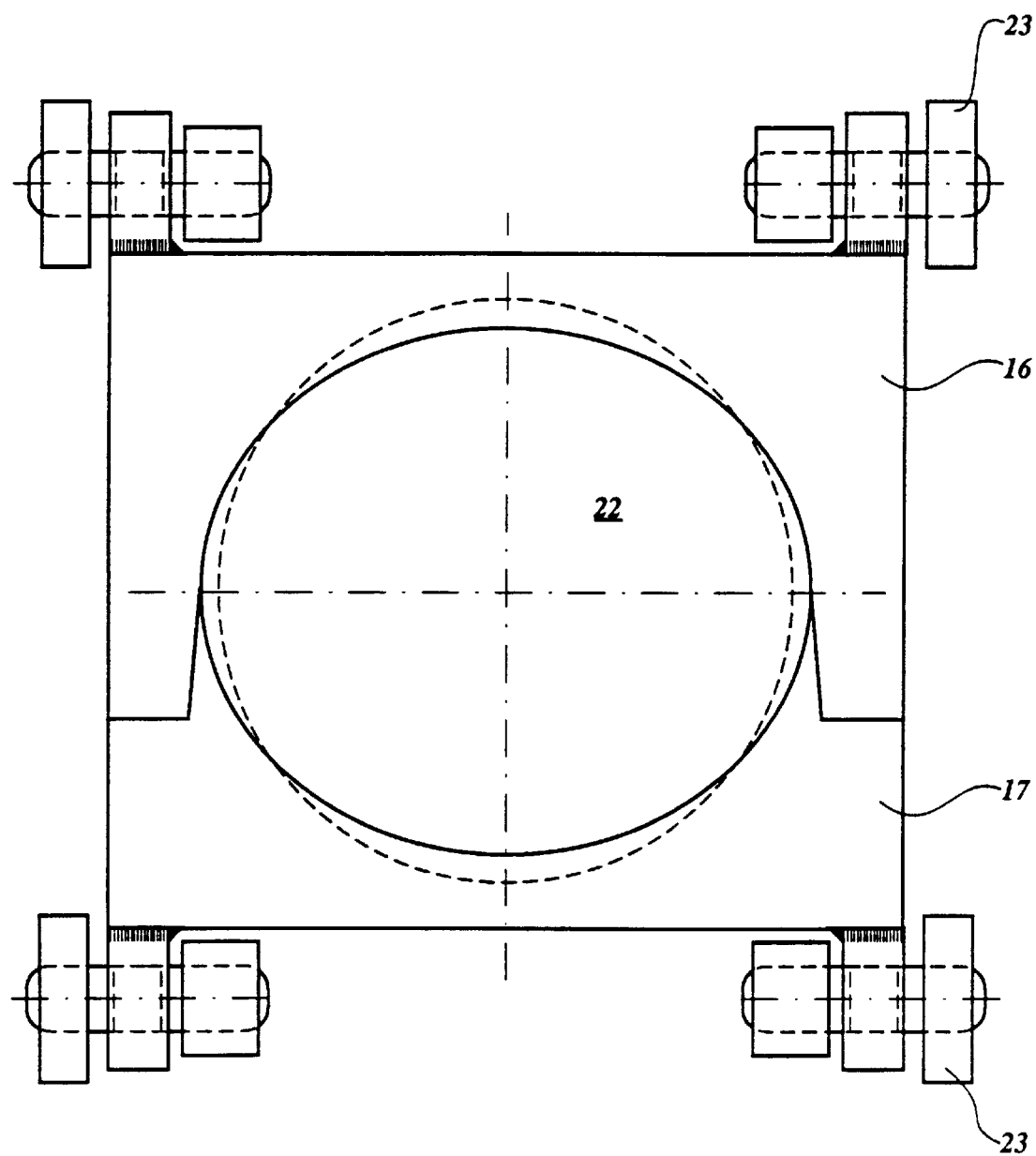
FIG. 2 shows diagrammatically a view of a pair of interacting blocks of the tube pushing device shown in FIG. 1.
Figure 3:
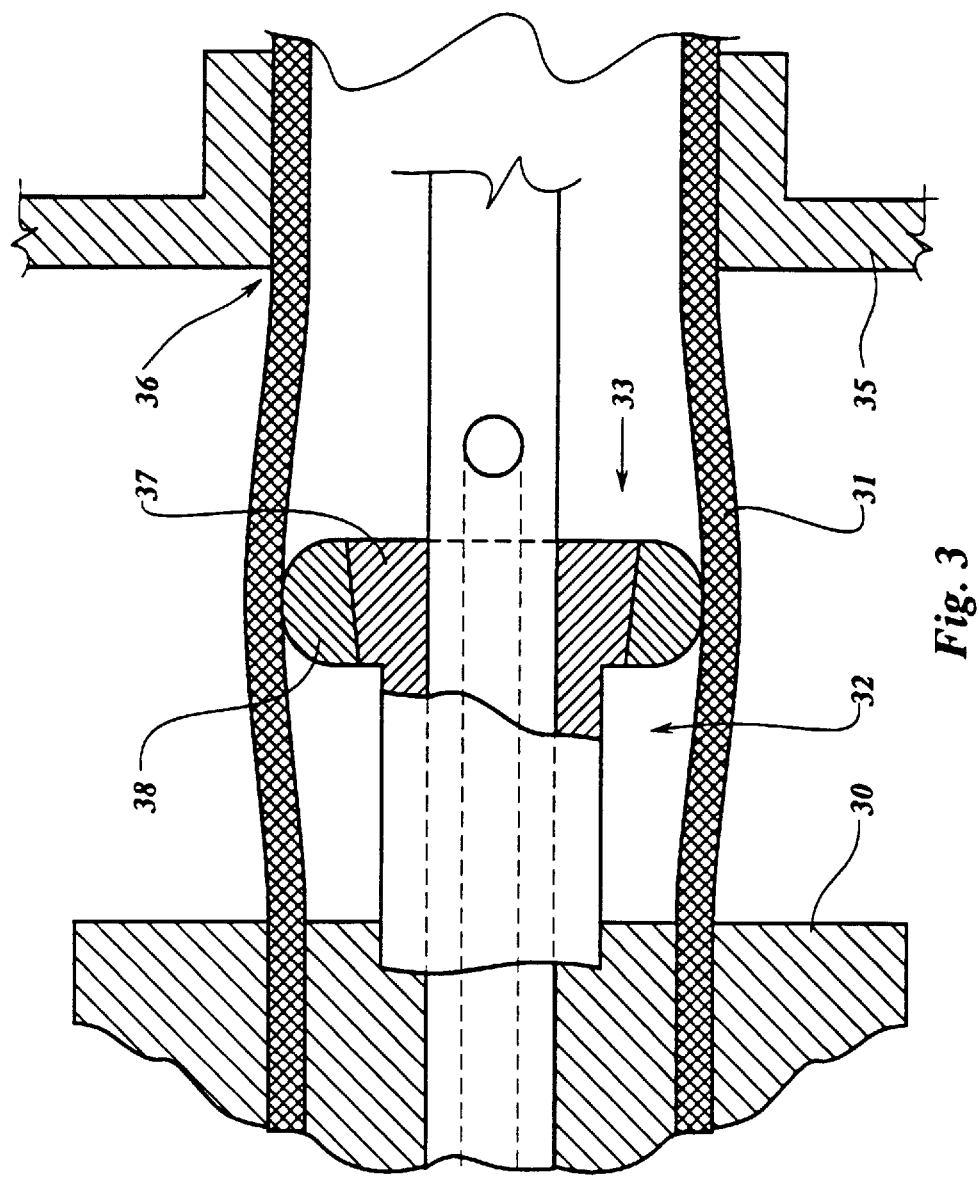
FIG. 3 shows diagrammatically a view in section of an assembly according to the invention for forming a division between the head of an extruder and a cooling/heating medium present in a tube coming out of said extruder, of the type which can be used in the case of the device shown in FIG. 1.

FIGS. 1–3 are based on an application in which a tube with a smooth cylindrical wall made of thermoplastic material is being manufactured. It will be clear that the inventive idea and solutions described here can also be used for the manufacture of tubular sections of a different cross-section, if necessary by adapting the embodiment of the parts described herein.

FIG. 1 shows an extruder 1 by means of which a tube 2 made of thermoplastic material is manufactured in a continuous process, which tube leaves the extruder 1 with a cylindrical initial cross-section.

The tube 2 is biaxially stretched by forcing the tube at a suitable orientation temperature of the plastic material over a mandrel 4 fixed by means of a tension member 3 to the extruder 1. The mandrel 4 has a cylindrical run-on part 5, a conical expansion part 6, and an essentially cylindrical run-off part 7.

In order to make the tube 2 reach the mandrel 4 in the most homogeneous state possible, after leaving the extruder 1 the tube 2 is guided through an external calibration sleeve 8 and subsequently through temperature-regulating means 9, for example through cooling with air or water, which temperature-regulating means influence the temperature of the plastic material of the tube 2 from the outside. For regulating the temperature of the tube 2, internal cooling of the tube 2 is also provided. For this purpose, cooling medium is supplied in a suitable manner through a pipe 10 to the interior of the tube 2 between the mandrel 4 and a sealing element 11. The sealing element 11 shown consists of several flexible rubber discs which rest against the inside wall of the tube 2.

In the case of polyolefins the orientation temperature of the plastic material of the tube while it is being forced over the mandrel is kept equal to or lower than the crystalline melting temperature of the plastic material. In the case of amorphous plastic material the orientation temperature of the plastic material of the tube while it is being forced over the mandrel is kept just above the glass transition temperature of the plastic material.

For forcing the tube 2 over the mandrel 4, a pushing device 12, which acts upon the outside of the tube 2, is present at a distance upstream of the mandrel 4, viewed in the direction of movement of the tube 2. The pushing device 12 shown will be explained in greater detail below.

A pulling device 25 is present downstream of the mandrel 4, for exerting an axial pulling force on the tube 2. Said pulling device 25 can be of a design which is generally known from the prior art.

The pushing device 12 is similar in construction to a so-called corrugator. The pushing device 12 comprises a frame bearing two chains 14, 15 of blocks 16, 17 respectively, which can be moved along a corresponding closed tracks determined by the frame. For the sake of clarity, only a few pairs of the blocks 16, 17 are shown. Each closed track has an active part in which the blocks 16, 17 belonging to the two chains 14, 15 act together upon the outer circumference of the tube 2 and enclose the tube 2 in pairs. By driving the two chains 14, 15 in the direction of the arrows, the tube 2 is pushed in the direction of the mandrel 4. The pushing device 12 is provided with temperature-regulating means 18, for regulating the temperature of the blocks 16, 17 of the pushing device 12.

It can be seen in FIG. 1 that the clamping of the tube 2 is removed gradually as it leaves the pushing device 12. This is achieved by the shape of the paths along which the blocks 16, 17 are guided. This shape is such that the contribution to the pushing force of the pair of blocks 16, 17 lying closest to the mandrel 4 is reduced to zero at the moment when the following pair of blocks 16, 17 reaches that position.

The tube 2 is cooled by means of a diagrammatically shown cooling device 20, by means of which the biaxial orientation obtained is fixed (frozen).

FIG. 2 shows a pair of blocks 16, 17 which belong to the chains 14, 15 respectively of the pushing device 12 shown in FIG. 1. The blocks 16, 17 are shown in the position in which they are situated in the active part of the closed track along which they move. The interacting blocks 16, 17 form a cavity 22 with an oval cross-section for the accommodation of the tube 2. This means that the tube 2, which leaves the extruder 1 and the calibrator 8 with a round initial cross-section, is deformed to a tube with an oval cross-section through the blocks 16, 17 acting thereon. For a better understanding of the invention the initial cross-section of tube 2 in FIG. 2 is shown by dashed lines.

The radial surface pressure between the tube 2, on the one hand, and the blocks 16, 17, on the other, caused by the deformation of the tube 2, makes it possible to exert a great pushing force on the tube without the risk of the blocks slipping relative to the tube 2. When a pair of blocks 16, 17 are resting against each other, each block 16, 17 forms a half of the cavity 22 bounded by the largest dimension of the oval cross-section. When the blocks 16, 17 are moved towards each other, the tube 2 is first deformed (compressed) at a point where no dividing seam is present in or between the blocks 16, 17, which prevents the occurrence of burrs on the outside of the tube 2. The circumferential dimension of the contact face for the tube 2 against the interacting blocks 16, 17 is slightly larger than the circumferential dimension of the tube 2. This prevents a burr from arising at the position of the dividing seam between the blocks 16, 17. Each block is provided with guide rollers 23, by means of which the blocks 16, 17 are guided along their closed circuit formed by the frame of the pushing device 12.

It can also be seen from FIG. 2 that the dividing face between the two blocks 16, 17 does not coincide with the central plane of the oval cavity 22, but that the cheeks of the block 16 project beyond said central face. The result of this is that when the blocks 16, 17 are moved apart, the tube 2 remains lying in the block 16 for a moment and is supported and guided by said block 16.

It can be seen in FIG. 1 that the blocks 16, 17 of the pushing device 12 act upon the tube 2 at a distance upstream of the mandrel 4. The tension member 3 is also made so thin that at the place where said blocks 16, 17 act upon the tube 2 the latter cannot come into contact internally with the tension member 3. In this way the risk of the tube 2 being able to become caught between undeformable elements present on the inside and the outside of the tube is avoided. Between the place where the blocks 16, 17 act upon the tube 2 and the expansion part 6 of the mandrel 4 there is such a great distance, preferably 5–10 times the diameter of the tube at this point, that there is damping of the variations inevitably occurring in the pushing drive in the case of such a pushing device 12. The result is that the tension state of the wall material of the tube 2 at the position of the mandrel 4 remains constant as far as possible. This is not only an advantage for controlling the stretching process, but also prevents in particular undesirable fluctuation of the wall thickness occurring in the axial direction of the manufactured tube 2.

Through the shape of the blocks 16, 17 described with reference to FIG. 2, the tube 2 is pushed forward, while the round initial cross-section of the tube is deformed to an oval cross-section. Causing a deformation makes the resistance of the tube to said deformation cause a surface pressure to arise between the tube and the drive means. As a result of this, a considerably greater pushing force can be exerted on a tube, in particular a smooth tube, than in the case of the method known from the prior art. The tube 2 is then forced over a mandrel 4 with a round cross-section, which is envisaged for the tube to be manufactured. The temporary deformation caused by the pushing device 12 in the tube which is still viscous at that moment is justified because the biaxial orientation of the molecules of the thermoplastic material occurring downstream of the pushing device 12 determines the ultimately manufactured tube 2.

The above-described design of the run-on part 5 of the mandrel 4 is based on the insight that in the tract between the pushing device 12 and the expansion part 6 of the mandrel 4 the tube 2 is subjected to an axial pressure which leads to upsetting of the tube 2. The result of this is that the internal dimensions of the tube 2 at that point will be slightly greater, generally several per cent (1–5%), than upstream of the pushing means 12. For correct guidance of the tube 2 relative to the mandrel 4 it is desirable for the tube 2 to be centred upstream of the expansion part 6 of the mandrel 4. In order to obtain contact between the tube 2 and the run-on part 5, the diameter of the run-on part 5 must then be adapted to the increase in the internal diameter of the tube 2 as the result of the upsetting effect. It is pointed out that the tube 2 leaves the pushing device 12 with a slightly oval cross-section (see FIG. 2). The internal diameter of the tube at this point can therefore be seen as the average of the greatest and smallest dimension of the tube 2. It can also be seen from this that the positioning of the pushing device 12 at a distance from the mandrel 4 in this embodiment of the blocks 16, 17 makes a gradual transition from the oval cross-section to the round cross-section possible. The length of the run-on part 5 is preferably at least three times the internal diameter of the tube 2 at this point. In this way the run-on part 5 also ensures that the circumstances which could lead to buckling of the tube 2 as a result of the pushing force exerted thereon are avoided, due to the fact that the buckling length is reduced.

FIG. 3 shows an assembly for forming a division between the head of an extruder 30 and a cooling/heating medium which is present in a tube 31 coming out of said extruder. The assembly according to the present invention comprises a sealing element 32 to be fixed to the extruder 30, which sealing element at a distance from the head of the extruder has an essentially undeformable part 33 having a cross-section at right angles to the longitudinal axis of the tube 31 which is slightly larger than the corresponding internal cross-section of the tube when said tube leaves the extruder. The assembly also comprises a passage element 35 which is placed at a greater distance from the extruder 30 and bounds a passage opening 36 for the tube which is smaller than the external diameter of the tube when the latter passes the sealing element 32. By means of this assembly it is ensured that the tube 31 moving out of the extruder 30 temporarily has a greater diameter at the position of the sealing element 32, which ensures excellent contact between the tube 31 and the sealing element 32. The sealing element 32 is an undeformable element, made up of a core 37 of poor heat-conducting material, for example a plastic material, and a metal ring 38 which surrounds the core 37 and comes into contact with the warm tube 31. The assembly described with reference to FIG. 3 can advantageously be used in the case of the method and device described with reference to FIG. 1 for manufacturing a biaxially oriented tube, as a replacement for the sealing element 11 shown in FIG. 1. In this case the function of the passage element 35 is fulfilled by the calibration sleeve 8. The use of the sealing element 11 at this point is undesirable because the rubber discs of said sealing element 11 cannot withstand the contact with the tube 1, which is still at a very high temperature immediately after leaving the extruder. Of course, the assembly described with reference to FIG. 3 can also be used in other situations where internal cooling of extruded sections is being carried out.

What is claimed is:

1. Method for manufacturing biaxially oriented tubing from thermoplastic material, comprising the steps of extruding a tube having a wall of thermoplastic material, cooling said tube by a means for regulating temperature to an orientation temperature of said thermoplastic material, and forcing said tube over a mandrel downstream of said means for regulating temperatures;

wherein said mandrel comprises an expansion section which produces expansion in a circumferential direction of the tube and a run-on section upstream of said expansion section, said mandrel being fixed to said extruder by a tension member extending between said extruder and said mandrel and said tension member being thinner than said run-on section of said mandrel;

wherein a pushing force is exerted on said tube between said means for regulating temperature and said mandrel by a pushing means acting externally upon said tube while said run-on section of said mandrel supports said tube internally; and wherein a pulling force is exerted on said tube by a pulling means downstream of said mandrel thereby causing an axial tension in said tube between said expanding section and said pulling means; and wherein the method further comprises cooling said tube by a cooling device downstream of said expansion section of said mandrel;

wherein said pushing means acts upon said tube causing a temporary deformation of said cross-section of said tube while avoiding contact between said tube and said tension member and said mandrel.

2. Method according to claim 1, wherein said tube has an initial cross-section upstream of said pushing means, said pushing means acting upon said tube while deforming the cross-section of said tube, and wherein said tube is forced over said mandrel having a cross-section whose shape corresponds to the shape of the tube to be manufactured.

3. Method according to claim 1, wherein said pushing means act upon said tube over a length thereof, the action of the pushing means being produced by several active elements of said pushing means which clamp said tube between them, said clamping of said tube being removed gradually as said tube leaves said pushing means.

4. Method according to claim 1, wherein said tube is round when leaving said means for regulating temperature and said pushing means comprises said tube to an oval cross-section, and wherein said run-on section of said mandrel is cylindrical.

* * * * *

UNITED STATES PATENT AND TRADEMARK OFFICE
CERTIFICATE OF CORRECTION

PATENT NO. : 5,817,270
DATED : October 6, 1998
INVENTOR(S) : Jan Hendrik PRENGER et al.

It is certified that error appears in the above-indentified patent and that said Letters Patent is hereby corrected as shown below:

In column 10, line 41, change "comprises" to --compresses--.

Signed and Sealed this

Sixteenth Day of March, 1999

Attest:

Q. TODD DICKINSON

Attesting Officer

Acting Commissioner of Patents and Trademarks